(12) United States Patent
Lautenschuetz et al.

(10) Patent No.: US 6,283,093 B1
(45) Date of Patent: Sep. 4, 2001

(54) METHOD AND APPARATUS FOR DETERMINING THE IGNITION ANGLE FOR AN INTERNAL COMBUSTION ENGINE WITH ADAPTIVE KNOCKING

(75) Inventors: Peter Lautenschuetz, Polchingen; Juergen Schenk, Albershausen; Hans-Joachim Volkmann, Stuttgart; Stephan Hartmann, Schwieberdingen, all of (DE)

(73) Assignees: DaimlerChrysler AG; Robert Bosch GmbH, both of Stuttgart (DE)

( * ) Notice: Subject to any disclaimer, the term of this patent is extended or adjusted under 35 U.S.C. 154(b) by 0 days.

(21) Appl. No.: 09/125,373
(22) PCT Filed: Feb. 12, 1997
(86) PCT No.: PCT/EP97/00633
  § 371 Date: Dec. 18, 1998
  § 102(e) Date: Dec. 18, 1998
(87) PCT Pub. No.: WO97/30286
  PCT Pub. Date: Aug. 21, 1997

(30) Foreign Application Priority Data

Feb. 14, 1996 (DE) .............................. 196 05 407

(51) Int. Cl.$^7$ .................................................. F02P 5/152
(52) U.S. Cl. ..................................... 123/406.33; 701/111
(58) Field of Search .................... 123/406.29, 406.33; 701/111

(56) References Cited

U.S. PATENT DOCUMENTS

| | | | | |
|---|---|---|---|---|
| 4,827,937 | * | 5/1989 | Kohler et al. | 123/406.33 |
| 4,903,210 | * | 2/1990 | Akasu | 123/406.33 |
| 5,090,382 | * | 2/1992 | Bolander et al. | 123/406.33 |
| 5,243,942 | * | 9/1993 | Entenmann et al. | 123/406.33 |
| 5,327,868 | * | 7/1994 | Witkowski et al. | 123/406.33 |
| 5,645,034 | * | 7/1997 | Entenmann et al. | 123/406.33 |

FOREIGN PATENT DOCUMENTS

| | | |
|---|---|---|
| 0302735A2 | 2/1989 | (EP) . |
| 0311097A2 | 4/1989 | (EP) . |
| 2232719A | 12/1990 | (GB) . |

\* cited by examiner

*Primary Examiner*—Willis R. Wolfe
(74) *Attorney, Agent, or Firm*—Evenson, McKeown, Edwards & Lenahan, P.L.L.C.

(57) ABSTRACT

A method for determining the ignition angle for an internal combustion engine with adaptive knocking control, in which the occurrence of knocking is reduced by a controlled adjustment of the ignition angle in the retarded direction. The current values for the adjustment in the retarded direction are stored in a characteristic diagram in an operating parameter-dependent fashion. An average adjustment in the retarded direction is determined from these characteristic diagram values, and both a correction ignition angle and a control range limitation for the knocking control are determined therefrom. The fuel quality and ambient influences are automatically sensed with reference to a learned RON level and are also used to reduce the amount of energy expended to control engine knocking.

12 Claims, 2 Drawing Sheets

| ROZ | THRESHOLD VALUE [°KW] |
|---|---|
| 0 | 4 |
| 1 | 3 |
| 2 | 3 |
| 3 | 8 |
| 4 | 8 |

Fig. 2

| Tmot\n | n1 | n2 | n3 | n4 | n5 |
|---|---|---|---|---|---|
| T1 | 0 | 1 | 1 | 1 | 0 |
| T2 | 0 | 1 | 1 | 0 | 0 |
| T3 | 0 | 0 | 1 | 0 | 0 |

Fig. 3

| ROZ$_{ums}$\n | n1 | n2 | n3 | n4 | n5 | n6 | n7 | n8 |
|---|---|---|---|---|---|---|---|---|
| 0 | 7 | 7 | 8 | 8 | 8 | 8 | 7 | 6 |
| 1 | 5 | 5 | 6 | 6 | 6 | 6 | 5 | 4 |
| 2 | 4 | 4 | 5 | 5 | 5 | 5 | 4 | 4 |
| 3 | 3 | 3 | 4 | 4 | 4 | 4 | 4 | 4 |
| 4 | 3 | 3 | 4 | 4 | 4 | 4 | 4 | 4 |

Fig. 4

| ROZ\TI8 | T1 | T2 | T3 | T4 | T5 | T6 | T7 | T8 |
|---|---|---|---|---|---|---|---|---|
| 0 | 0 | 0 | 0 | 0 | 0 | 0 | 0 | 0 |
| 1 | 0 | 0 | 0 | 0 | 0.5 | 1 | 2 | 3 |
| 2 | 0 | 0 | 0 | 0 | 1 | 2 | 3.5 | 5 |
| 3 | 0 | 0 | 0 | 0 | 2 | 4 | 5 | 7 |
| 4 | 0 | 0 | 0 | 0 | 2 | 4 | 5 | 7 |

Fig. 5

| FACTOR\n | n1 | n2 | n3 | n4 | n5 | n6 | n7 | n8 |
|---|---|---|---|---|---|---|---|---|
| f | 0.8 | 0.9 | 1.0 | 1.0 | 1.2 | 1.4 | 1.2 | 1.0 |

Fig. 6

METHOD AND APPARATUS FOR DETERMINING THE IGNITION ANGLE FOR AN INTERNAL COMBUSTION ENGINE WITH ADAPTIVE KNOCKING

BACKGROUND AND SUMMARY OF THE INVENTION

The invention relates to a method for determining the ignition angle for an internal combustion engine with adaptive knocking control.

German patent document DE 40 08 170 A1, for example, discloses such an adaptive knocking control of an internal combustion engine, in which the ignition angle is read out from a characteristic diagram, and is by a predetermined amount when knocking occurs. The ignition angle is then advanced by a reduced amount until knocking again occurs. When the engine leaves a predetermined operating range, the current ignition angle is stored in an adaptive characteristic diagram for reuse the next time the operating range is reached. DE 40 01 476 A1 discloses how, instead of the current ignition angle, the mean value of the control ranges in the operating range are stored in the adaptive characteristic diagram.

The tendency of an internal combustion engine to knock increases as the rotational speed rises and the fuel quality (the so-called RON value) decreases. The dependence of the rotational speed is taken into account, for example, according to DE 42 05 889 A1, via a rotational speed-dependent weighting factor for the control range of the knocking control. In addition, in order to take into account the RON value of the fuel used, it is known to use different characteristic diagrams for the set point ignition angle. The changeover between these characteristic diagrams is carried out via a mechanical or electronic switch which has to be activated manually when the user of the vehicle fills the vehicle fuel tank with fuel of a different quality. If this changeover process is forgotten, or not carried out for some other reasons, knocking increases. Additionally, with these methods, the influence of the ambient air pressure on the occurrence of knocking events is not taken into account.

The object of the invention is to provide a method and apparatus for adaptive knocking control for internal combustion engines which automatically takes into account the effects of ambient conditions and the fuel quality.

This and other objects and advantages are achieved by the method and apparatus according to the invention, in which the occurrence of knocking is reduced by a controlled adjustment of the ignition angle in the retarded direction. The current values for the adjustment in the retarded direction are stored in a characteristic diagram in an operating parameter-dependent fashion. An average adjustment in the retarded direction is determined from these characteristic diagram values, and both a correction ignition angle and a control range limitation for the knocking control are determined therefrom. The fuel quality and ambient influences are automatically sensed with reference to a learned RON level, and are also used to reduce the amount of energy expended to control engine knocking.

In this manner, it is simple and easy to take into account the fuel quality and ambient influences on the knocking control of an internal combustion engine. On the one hand, the expected fuel quality and ambient conditions can be predefined by means of a starting value. On the other hand, however, deviations from these are taken into account by determining a learned RON level from the average retarded-direction adjustment angles.

The knocking control can be relieved of work by predefining a correction ignition angle on the basis of the current RON level. At the same time, by predefining the maximum control range as a function of the learned RON level, the sum of the correction ignition angle and the actual ignition angle adjustment of the knocking control is prevented from exceeding the permissible range.

Other objects, advantages and novel features of the present invention will become apparent from the following detailed description of the invention when considered in conjunction with the accompanying drawings.

BRIEF DESCRIPTION OF THE DRAWINGS

FIG. 2 shows a characteristic diagram with threshold values for the changeover of the learned RON level as a function of the valid RON level;

FIG. 3 shows a weighting mask for those operating states which are taken into account in the determination of the learned RON level;

FIG. 4 shows a characteristic diagram of the maximum knocking control range as a function of the learned RON level and the engine speed;

FIG. 5 shows a characteristic diagram of the basic retarded-direction adjustment as a function of the engine load and the valid RON level; and FIG. 6 shows a characteristic diagram of a weighting factor for determining a correction ignition angle as a function of the engine speed.

DETAILED DESCRIPTION OF THE DRAWINGS

Figure 1:
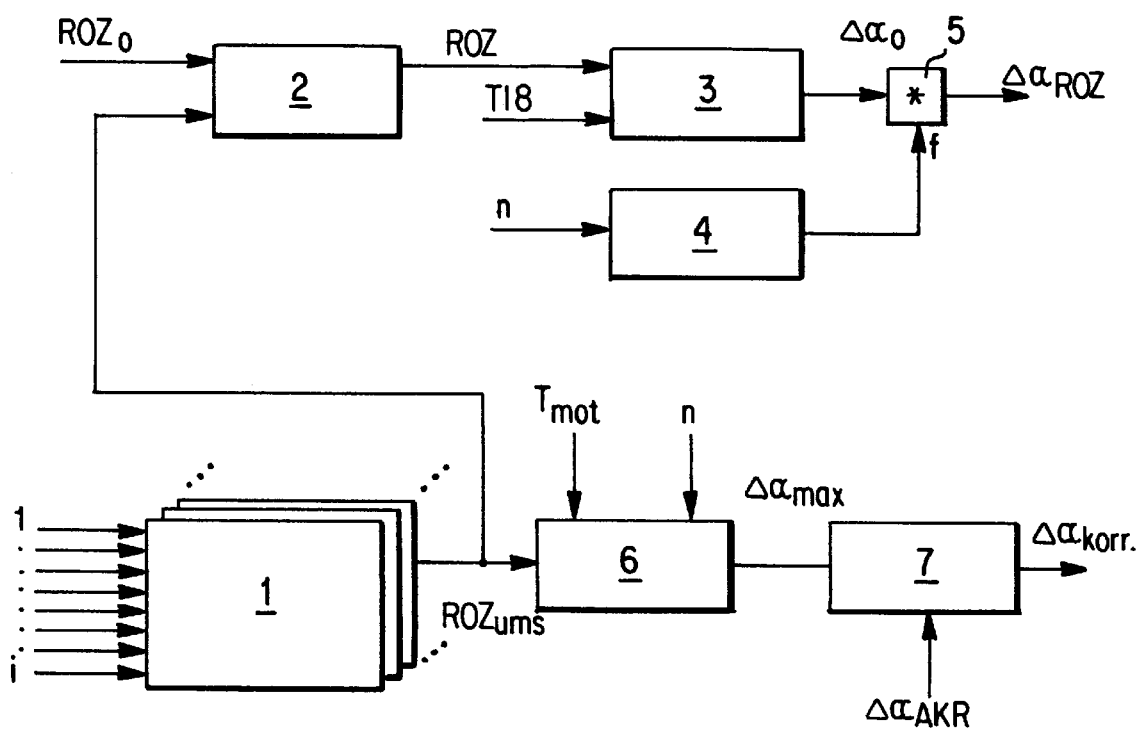
FIG. 1 shows a block circuit diagram of the method according to the invention.

Adaptive knocking controls are known from the prior art and will therefore only be described briefly at this point. Internal combustion engines are preferably operated with an ignition time that is advanced as far as possible. However, in this context, knocking combustion may occur under certain operating conditions. With the aid of knocking control, attempts are then made to avoid such undesired knocking events. For this purpose, the ignition angle which is determined by the engine controller is retarded by a predefined amount when knocking occurs. A maximum control range is subsequently prescribed for the adjustment in the retarded direction. Next, the ignition angle is incrementally moved back in the advanced direction until knocking again occurs.

In adaptive knocking control systems, operating parameters of the internal combustion engine (preferably load and rotational speed) are divided into prescribed intervals and a predefined number of operating states is thus defined. At the changeover from one such operating state into another, the current adjustment in the retarded direction is stored in a characteristic diagram and read out again when this operating state is again reached, and is also used as a starting value. If the knocking control is cylinder-specific, such a characteristic diagram is stored for each cylinder.

The tendency of the internal combustion engine to knock depends not only on other operating parameters but also on the quality of the fuel used and on ambient conditions (the ambient air pressure, for example). The fuel quality is generally described here in the form of a so-called RON value which specifies the average octane content in the fuel.

In the case of adaptive knocking control, the current adjustment in the retarded direction is stored in each case for the instantaneous fuel quality and the current ambient conditions. However, if the fuel quality or the ambient conditions change before the operating state is reached again, the stored adjustment in the retarded direction no longer corresponds to the current operating state of the internal combustion engine. If in the meantime, for example, fuel with a lower RON value is filled into the fuel tank, the tendency of the internal combustion engine to knock increases. However, this is not yet taken into account by the stored adjustment in the retarded direction, when an operating state is reached for the first time. As a result of the incidence of knocking increases in each operating state until a suitable adjustment in the retarded direction is reached.

The invention is based on the recognition that the retarded-direction adjustment which is to be set changes as a function of the fuel quality and of the ambient conditions to the same degree in all operating states. When a fuel of relatively poor quality is used, the retarded-direction adjustment angles which are stored in the characteristic diagram increase (as a result of the adaptive knocking control) for all the operating states which are reached.

From the stored values for the adjustment in the retarded direction, it is thus possible to determine a learned RON level, designated by $RON_{ums}$, which simultaneously describes the influences of the fuel quality and the ambient conditions. The valid RON level is then used to determine a correction ignition angle which takes into account the aforementioned influence parameters. However, at the same time, the RON level is also used to adapt the maximum control range to the basic adjustment in the retarded direction. As the basic adjustment in the retarded direction increases, the control range which is available for normal knocking control should in fact be reduced.

When the internal combustion engine is restarted, the valid RON level is read out from a non-volatile memory (for example, a so-called EEPROM). This starting value for the RON level is preset during manufacture as a function of the expected fuel and ambient conditions at the place of use of the vehicle. However, it can be changed later by specialists at a workshop.

The learned RON level $RON_{ums}$ is determined according to a freely selectable number of adaptations of the knocking control. This time period is required for the knocking control to be able to adapt itself to the instantaneous fuel quality and the prevailing ambient conditions. This learned RON level $RON_{ums}$ is then compared with the starting value $RON_0$, and the valid RON level RON is then (if appropriate) raised to the higher of the two RON levels $RON_0$, $RON_{ums}$. In this context, a higher RON level characterizes an increased tendency of the internal combustion engine to knock (for example, due to the use of fuel with a lower octane content). After the changeover into a higher RON level, the learned RON level $RON_{ums}$ is determined again (after a likewise freely selectable number of adaptations of the knocking control) and if appropriate the valid RON level is again increased.

The block identified by 1 in FIG. 1 contains the knocking-control characteristic diagrams stored for the i cylinders of an internal combustion engine as a function of rotational speed n and load L. Here, the rotational speed range is divided, for example, into 5 intervals, and the load range is divided into 3 intervals. As a result, a total of 15 operating states are defined. From the data stored in the characteristic diagrams, a learned RON level, designated by $RON_{ums}$, which describes the influence of the fuel quality and of the ambient conditions, is then determined after a predefined number of adaptations of the knocking control.

The learned RON level $RON_{ums}$ is used in blocks 2 and 6 as an input parameter. A starting value for the RON level $RON_0$, which is stored in a non-volatile memory, is input into block 2 as a further input parameter. The RON levels $RON_{ums}$ and $RON_0$, are compared in block 2, and the larger of the two levels is transferred to block 3 as the valid RON level. With reference to this RON level and to the current engine load T18, a basic retarded-direction adjustment $\Delta\alpha_0$ is determined in block 3. However, instead of, or in addition to the engine load T18, the engine temperature may also be used as an input parameter. Parallel to this, a correction factor f is determined in block 4 as a function of the engine speed n and is then multiplied by the basic retarded-direction adjustment $\Delta\alpha_0$ in block 5 in order to determine a correction ignition angle $\Delta\alpha_{ron}$.

In block 6, a maximum control range $\Delta\alpha_{max}$ for the knocking control is determined from the learned RON level $RON_{ums}$ (as a function of the engine temperature $T_{mot}$ and/or engine speed n). In block 7, this maximum control range $\Delta\alpha_{max}$ is then continuously compared with the control range $\Delta\alpha_{AKR}$ determined by a conventional knocking control system (not shown).

If the desired control range $\Delta\alpha_{AKR}$ is smaller here than the maximum control range $\Delta\alpha_{max}$, the desired control range $\Delta\alpha_{AKR}$ is transferred to the ignition angle-setting system as manipulated variable $\Delta\alpha_{korr}$. If, on the other hand, the desired control range $\Delta\alpha_{AKR}$ exceeds the maximum control range $\Delta\alpha_{max}$, the maximum control range $\Delta\alpha_{max}$ is output as manipulated variable $\Delta\alpha_{korr}$. Expressed in simple terms, the control range $\Delta\alpha_{AKR}$ determined by the knocking control system is therefore limited in block 7 by the maximum control range $\Delta\alpha_{max}$.

For the preset RON level $RON_0$, it is possible (as previously described above) to predefine a fixed value which cannot be varied during operation. However, this preset RON level can be adapted at any time to local conditions by specialist personnel in a workshop. However, it is also conceivable when terminating the method to write the valid RON level which is weighted with a factor <1 into the EEPROM. The factor, for example with a value of 0.5, ensures the possibility of changing over from a higher RON level into a lower one. In a case in which the RON level $RON_0$ stored in the EEPROM is higher than the learned RON level $RON_{ums}$, the higher RON level $RON_0$, from the EEPROM would in fact be taken into account in block 2 during every comparison operation. Thus, the next time the method was terminated, the higher RON level would also be stored in the EEPROM as the valid RON level. It would no longer be possible to reach a lower RON level.

A way of determining the learned RON level $RON_{ums}$ will now be explained in more detail with reference to an exemplary embodiment illustrated in FIGS. 2 and 3. First, an average retarded-direction adjustment $\Delta\bar{\alpha}$ is determined (for example, as an arithmetic mean value of all the characteristic diagram entries) from the values for the adjustment in the retarded direction stored in the characteristic diagram for the knocking control:

$$\Delta\bar{\alpha} = \sum_{i,j} \Delta\alpha_{i,j}(i+j)$$

This average adjustment in the retarded direction $\Delta\bar{\alpha}$ is then compared with a threshold value which is predefined as a function of the valid RON level. An exemplary embodiment of such a value table is shown in FIG. 2, where a total of five RON levels are provided. If the average adjustment in the retarded direction $\Delta\bar{\alpha}$ then exceeds the current threshold value, the learned RON level $RON_{ums}$ is increased by one increment. If the internal combustion engine is therefore operated, for example, at RON level 0, the system is switched over to RON level 1. This switch-over occurs if the average adjustment in the retarded direction $\Delta\bar{\alpha}$ exceeds the threshold value 4° crank angle. Next, in block 2, this learned RON level $RON_{ums}$ is compared with the starting value $RON_0$, and the larger of the two RON levels is used as the valid RON level.

Since the sensing of knocking events does not operate in an optimum way in all operating states, it is, however, also possible to use (for the determination of the average adjustment in the retarded direction $\Delta\bar{\alpha}$) only those operating states in which the knocking detection supplies reliable results. For this purpose, the characteristic diagram values which correspond to the operating states that are less reliable for knocking control to be masked via a corresponding weighting mask are used (for example, as illustrated in FIG. 3). In order to determine the average adjustment in the retarded direction $\Delta\bar{\alpha}$, the summation in the above formula extends only over those operating states which are characterized by a 1 in the weighting mask in FIG. 3. The operating states which are characterized with a 0 are not taken into account.

In addition to the average adjustment in the retarded direction $\Delta\bar{\alpha}$, the current knocking frequency $\Delta\alpha_{act}$ can also be used as the changeover criterion for the determination of the learned RON level $RON_{ums}$. The current knocking frequency $\Delta\alpha_{act}$ is determined in each case over a prescribed time period $t_1$. After this time period $t_1$ has expired, the current knocking frequency $\Delta\alpha_{act}$ is then compared with a corresponding threshold value, which can be predefined as a function of operating parameters, and the determination is started again. If the current knocking frequency $\Delta\alpha_{act}$ exceeds the corresponding threshold value at the end of a time period $t_1$, the learned RON level $RON_{ums}$ is increased by one increment.

The time period $t_1$ is determined, for example, with the aid of a time counter. In this case, the time counter runs only when the knocking control is active, and the operating parameters are located in a masked range. If one of the conditions is not fulfilled, the time counter is stopped. If all the conditions are then fulfilled again, the time counter runs again.

The current knocking frequency $\Delta\alpha_{act}$ can be determined in two different ways. First, the number of knocking events within the time period $t_1$ can be sensed and then multiplied by the average adjustment in the retarded direction $\Delta\bar{\alpha}$. Here, only those knocking events which occur while the time counter is running are counted. Second, it is also possible when a knocking event occurs, to read out in each case the stored retarded-direction adjustment angle $\Delta\alpha_{i,j}$ from the characteristic diagram (if the time counter is running) and to sum these values over the time period $t_1$ with the aid of an integrator. When the learned RON level $RON_{ums}$ is increased by one increment or after the time period $t_1$ has expired, the time counter and the integrator are simultaneously reset. In this way, repeated incrementation of the learned RON level $RON_{ums}$ is possible within one operating cycle.

The two changeover criteria which have been described can be used either alternatively or simultaneously, in which case when they are used simultaneously a changeover into a higher level occurs only if both conditions are fulfilled simultaneously.

The maximum control range $\Delta\alpha_{max}$ can likewise be determined with reference to a characteristic diagram. An exemplary embodiment of such a characteristic diagram is shown by FIG. 4. Here, the maximum control ranges $\Delta\alpha_{max}$ are stored in degrees crank angle as a function of the learned RON level $RON_{ums}$ and the current engine speed n, when the value range for the engine speed is divided into eight intervals n1–n8. When determining the maximum control range $\Delta\alpha_{max}$, it is possible to take into account not only the engine speed n but also the engine temperature $T_{mot}$. This maximum control range $\Delta\alpha_{max}$ is then transferred to block 7 in order to delimit the control range $\Delta\alpha_{AKR}$ determined by the knocking control system.

The correction ignition angle $\Delta\alpha_{RON}$ can likewise be determined using corresponding characteristic diagrams such as those shown in FIGS. 5 and 6. For this purpose, the values for the basic adjustment in the retarded direction $\Delta\alpha_0$ are stored in degrees crank angle (in the characteristic diagram according to FIG. 5) as a function of the valid RON level RON and of the engine load T18. Eight intervals are in turn provided for the value range of the engine load T18. The influence of the engine speed n during the determination of the correction ignition angle $\Delta\alpha_{RON}$ is taken into account via a further characteristic diagram such as illustrated, for example, in FIG. 6. A dimensionless factor f is stored in this characteristic diagram as a function of the engine speed. The correction ignition angle $\Delta\alpha_{RON}$ is then determined in block 5 by multiplying the basic adjustment in the retarded direction $\Delta\alpha_0$ by this factor f.

By using this correction ignition angle $\Delta\alpha_{RON}$, it is possible to reduce the energy expended to control the knocking control system. As a result, the occurrence of knocking events can be reduced, the service life of the internal combustion engine and the comfort of the ride can also be increased. In addition, the installation of a mechanical or electronic switch for setting the fuel quality which is being used can be dispensed with. In addition to the fuel quality, the influence of ambient effects (the ambient air pressure, for example) is also taken into account.

The adaptation of the internal combustion engine to the anticipated place of use of the vehicle can be performed via a corresponding coding of the characteristic diagrams and the starting value for the RON level $RON_0$. For example, in a vehicle which is being operated in a country with an average fuel quality of RON-98, the RON level is set to a starting value $RON_0=0$. $RON_0=1$ would then correspond, for example, to an average fuel quality of RON 95.

In another embodiment according to the present invention, the method automatically takes into account a brief change in the ambient influences, for example, when the engine is operated with fuel of relatively low quality or as a result of traveling in mountainous terrain. The method according to the invention can also be used without modification for different degrees of a tendency to knock via different coding of the characteristic diagrams.

The coding of the characteristic diagrams which are shown in FIGS. 2–6 constitutes only one possible exemplary embodiment. The range of protection of the invention is therefore not to be restricted to these exemplary embodiments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for determining the ignition angle for an internal combustion engine with adaptive knocking control, comprising:
   a non-volatile memory for storing a characteristic diagram and generating a learnt RON level;
   a first device operatively coupled to the non-volatile memory for receiving a starting value of a RON level and the learnt RON level;
   a second device operatively coupled to the non-volatile memory and the first device for determining a maximum control range;
   a third device operatively coupled to the second device for continuously comparing the maximum control range with a control range;
   a fourth device operatively coupled to the first device for determining a basic retarded-direction adjustment;
   a fifth device operatively coupled to the fourth device for multiplying a correction factor by the basic retarded-direction adjustment; and
   a sixth device operatively coupled to the fifth device for determining the correction factor.

2. A method for determining the ignition angle for an internal combustion engine with adaptive knocking control, comprising the steps of:
   determining, continuously, a retarded-direction adjustment angle which reduces engine knocking;
   storing the retarded-direction adjustment angle in an adaptive characteristic diagram as a function of first operating parameters;
   determining an average adjustment in a retarded direction retarded-direction adjustment angles of a plurality of characteristic diagram ranges; and
   determining from the average adjustment, as a function of second operating parameters, both an additional correction ignition angle, which takes into account at least one of the fuel quality and ambient conditions, and a maximum control range, in order to limit the retarded-direction angle adjustment.

3. The method according to claim 2, further comprising the steps of:
   associating a plurality of learnable RON levels with threshold values; and
   changing from a current RON level into a next highest learnable RON level if at least one of the average adjustment in the retarded direction and a current knocking frequency exceeds a respectively predefined threshold value.

4. The method according to claim 2, further comprising the step of:
   storing a maximum control range for the knocking control as a function of the learnt RON level and operating parameters of the internal combustion engine.

5. The method according to claim 2, further comprising the steps of:
   storing a starting value for a RON value in a non-volatile memory;
   determining a larger of one of two RON values;
   assigning as the current RON value the determined larger value of the two RON values; and
   determining the correction ignition angle from the assigned RON value using an operating parameter-dependent characteristic diagram.

6. The method according to claim 2, further comprising the steps of:
   weighting the RON value, which is current when the internal combustion engine is switched off, with a factor <1; and
   storing the RON value, which is current when the internal combustion engine is switched off, in a non-volatile memory.

7. The method according to claim 2, further comprising the step of:
   determining the average adjustment in the retarded direction as an arithmetic mean value of the retarded-direction adjustment angle.

8. The method according to claim 7, further comprising the step of:
   utilizing predefined operating states only during at least one of the determination of the average adjustment in the retarded direction and a current knocking frequency.

9. The method according to claim 2, further comprising the step of:
   determining a current knocking frequency over a predefined time period.

10. The method according to claim 9, further comprising the step of:
    utilizing predefined operating states only during at least one of the determination of the average adjustment in the retarded direction and a current knocking frequency.

11. The method according to claim 9, further comprising the steps of:
    determining the current knocking frequency by sensing a number of knocking events within a time period; and
    multiplying the current knocking frequency by the average adjustment in the retarded direction.

12. The method according to claim 9, further comprising the steps of:
    reading each stored retarded-direction adjustment angle from the characteristic diagram; and
    summing each read stored retarded-direction adjustment angle over the time period in order to determine the current knocking frequency when a knocking event occurs.

* * * * *